United States Patent
Manternach

(10) Patent No.: US 10,869,422 B2
(45) Date of Patent: Dec. 22, 2020

(54) OBJECT DETECTION AND DOCUMENTATION SYSTEM FOR TILLAGE EQUIPMENT

(71) Applicant: Deere & Company, Moline, IL (US)

(72) Inventor: Byron N. Manternach, Dunkerton, IA (US)

(73) Assignee: DEERE & COMPANY, Moline, IL (US)

( * ) Notice: Subject to any disclaimer, the term of this patent is extended or adjusted under 35 U.S.C. 154(b) by 399 days.

(21) Appl. No.: 15/837,102

(22) Filed: Dec. 11, 2017

(65) Prior Publication Data

US 2019/0174666 A1 Jun. 13, 2019

(51) Int. Cl.
| | | |
|---|---|---|
| *A01B 79/00* | (2006.01) | |
| *A01B 63/00* | (2006.01) | |
| *A01B 69/00* | (2006.01) | |
| *A01B 76/00* | (2006.01) | |
| *G05B 19/401* | (2006.01) | |
| *A01B 49/02* | (2006.01) | |

(52) U.S. Cl.
CPC .......... *A01B 79/005* (2013.01); *A01B 63/008* (2013.01); *A01B 69/003* (2013.01); *A01B 76/00* (2013.01); *G05B 19/401* (2013.01); *A01B 49/027* (2013.01); *G05B 2219/45134* (2013.01)

(58) Field of Classification Search
CPC .... A01B 79/005; A01B 63/008; A01B 69/003
USPC ....................................... 172/5, 6
See application file for complete search history.

(56) References Cited

U.S. PATENT DOCUMENTS

| | | | |
|---|---|---|---|
| 6,141,614 A * | 10/2000 | Janzen et al. ........ | A01B 79/005 172/2 |
| 9,213,905 B2 * | 12/2015 | Lange et al. ....... | G06K 9/00805 |
| 2003/0187560 A1* | 10/2003 | Keller et al. ......... | A01B 79/005 701/50 |
| 2008/0177449 A1 | 7/2008 | Pickett et al. | |
| 2011/0153168 A1 | 6/2011 | Peterson et al. | |
| 2012/0237083 A1 | 9/2012 | Lange et al. | |
| 2015/0264857 A1 | 9/2015 | Achen et al. | |

FOREIGN PATENT DOCUMENTS

DE 3601465 A1 7/1987

* cited by examiner

*Primary Examiner* — Thomas B Will
*Assistant Examiner* — Joel F. Mitchell
(74) *Attorney, Agent, or Firm* — Taft Stettinius & Holllister LLP; Stephen F. Rost

(57) ABSTRACT

A work machine, with a frame member, a ground engaging mechanism coupled to the frame member and configured to at least partially contact an underlying surface, a sensor coupled to the ground engaging mechanism, the sensor positioned to identify a displacement of the ground engaging mechanism relative to the frame, a controller in communication with the sensor, and a location system in communication with the controller. Wherein, the controller marks a location that corresponds with the position of the ground engaging mechanism, the location being identified by the location system when the sensor identifies the displacement of the ground engaging mechanism.

15 Claims, 5 Drawing Sheets

OBJECT DETECTION AND DOCUMENTATION SYSTEM FOR TILLAGE EQUIPMENT

FIELD OF THE DISCLOSURE

The present disclosure relates to object detection in soil, and in particular, to object detection in soil identified by a tillage implement.

BACKGROUND OF THE DISCLOSURE

Many work machines or the like are configured to contact and manipulate an underlying surface. Often, the work machine is at tractor that has an implement coupled thereto. The tractor has a ground engaging mechanism that provides traction on the underlying surface and allows the tractor to pull or push the implement there along. In turn, the implement contacts and manipulates the underlying surface. The implement is often specifically designed to manage certain types of properties for the underlying surface. More specifically, the implement may be configured to manipulate a sandy, clay, hard-packed, muddy or the like underlying surface. When the implement contacts a portion of the underlying surface that is not consistent with the expected properties of the underlying surface, for example a large rock, the implement may be damaged because of the unexpected debris in the underlying surface.

To protect the work machine from damage, the underlying surface is often prepared by removing any unexpected debris prior to manipulating the underlying surface with the work machine. This is done by visually inspecting the underlying surface and removing any obvious debris such as large rocks, stumps, or the like. However, unexpected debris is often positioned beneath the underlying surface and difficult to identify. Accordingly, a user may also identify underlying debris once the work machine begins to manipulate the underlying surface. The user identifies when the work machine contacts unexpected debris utilizing the user's senses to determine when the work machine has an abnormal contact. More specifically, the user may hear an abnormal noise, see the implement move abnormally, or feel the work machine make an abnormal movement among other things.

Once the work machine begins to manipulate the underlying surface, when the user identifies debris, the work machine is often stopped so the user can identify the debris. The user may identify the debris with a visual marker such as a flag or remove the debris altogether. The user may then return to the work machine and continue manipulating the underlying surface. Once the user is done with the work machine, the user may return to the underlying surface and remove all of the debris identified by visual markers.

The present systems require a user to stop the work machine to identify debris in the underlying surface each time debris is contacted. This disrupts the work machine and prolongs the time necessary for the work machine to manipulate the underlying surface as desired by the user.

SUMMARY

One embodiment may be a work machine with a frame member, a ground engaging mechanism coupled to the frame member and configured to at least partially contact an underlying surface, a sensor coupled to the ground engaging mechanism, the sensor positioned to identify a displacement of the ground engaging mechanism relative to the frame, a controller in communication with the sensor, and a location system in communication with the controller. Wherein, the controller marks a location that corresponds with the position of the ground engaging mechanism, the location being identified by the location system when the sensor identifies the displacement of the ground engaging mechanism.

In one example of this embodiment, the ground engaging mechanism is any one of a ripper, a blade, a roller, a sweep, or a tine.

In another example, the controller receives data from the sensor and the controller applies a filter to the data before identifying the displacement.

In yet another example, the frame member and ground engaging mechanism are part of a tillage implement coupled to a tractor. In one aspect of this example, the location system is positioned on the tractor. In another aspect of this example, the controller determines the position of the ground engaging mechanism relative to the location system before the controller marks the location.

Another example of this embodiment includes a user interface, wherein the user interface indicates a confirmation prior to marking the location. One aspect of this example includes a user input, wherein the user input must be engaged during the confirmation for the controller to mark the location.

Another embodiment is a method for identifying an obstruction in a field that includes providing a ground engaging mechanism, a location system, a controller, and a sensor, communicating, to the controller, a primary position of the location system, storing, in the controller, a ground engaging offset determined relative to the primary position, identifying, with the controller communicating with the sensor, when the ground engaging mechanism transitions to a contact position, and determining, with the controller, a ground engaging location based on the primary position and the ground engaging offset when the ground engaging mechanism is in the contact position.

In one example of this embodiment, the location system is global positioning system and the primary position is a geographic coordinate.

Another example includes providing a user interface and sending an indication to the user interface when the ground engaging mechanism transitions to the contact position. One aspect of this example includes providing a user input having an engaged option and saving the ground engaging location to a memory unit when the user input is transitioned to the engaged position. Another aspect includes removing the ground engaging location stored in the controller during the storing the ground engaging location step when the user input is not transitioned to the engaged position within a preset time. In yet another aspect of this example the user input has a disengaged position, wherein when the user input is transitioned to the disengaged position, the controller removes the ground engaging location stored in the controller during the storing the ground engaging location step.

In yet another example, the ground engaging location is determined based on a length value and a width value relative to the location system stored in the controller. In another aspect of this example the determining the ground engaging location step is executed by determining the ground engaging location based on the length value, the width value, and the primary position.

Yet another embodiment includes a system for identifying an obstruction in an underlying surface including a work machine having a location system, a controller in communication with the location system to actively determine a first geographic location of the work machine, an implement coupled to the work machine and having a first ground engaging mechanism, and a first sensor coupled to the first ground engaging mechanism and in communication with the controller, the first sensor configured to identify a contact movement of the first ground engaging mechanism. Wherein, the controller determines a second geographic location for the first ground engaging mechanism based on the distance of the first ground engaging mechanism from the location system when the first sensor identifies the contact movement.

In one example of this embodiment, the controller stores the second geographic location in a memory unit each time the contact movement is identified.

Yet another example includes a user interface, wherein the user interface sends an audio or visual signal each time the contact movement is identified by the controller.

Another example has a second ground engaging mechanism and a second sensor, wherein the second ground engaging mechanism is located at a different location relative to the location system than the first ground engaging mechanism.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
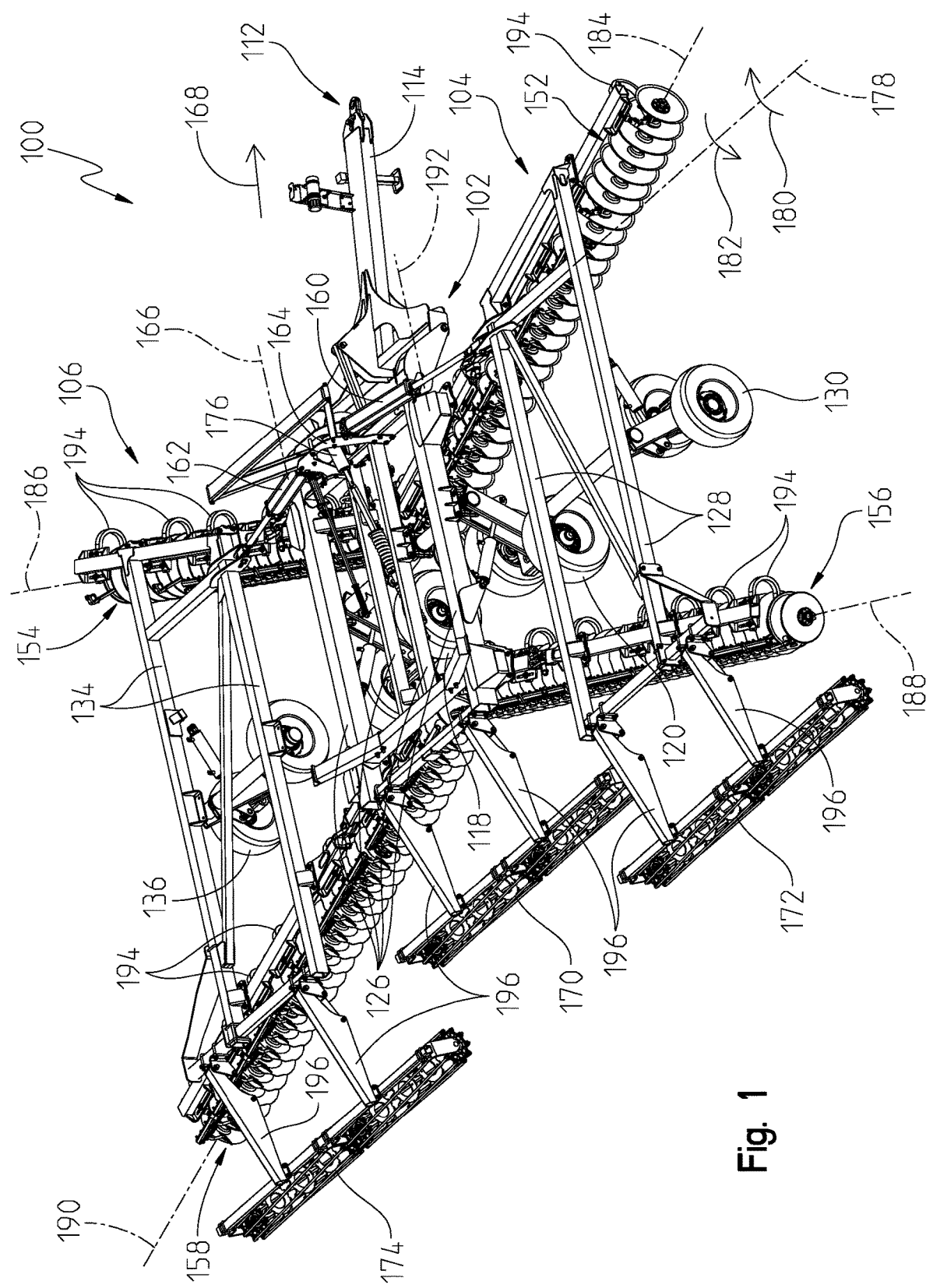
FIG. 1 is an elevated view of one embodiment of an agricultural implement.

Referring to FIG. 1, one non-exclusive example of an agricultural implement 100 is shown. The implement 100 is designed to couple to a work machine and perform a work function. For example, the implement may include work tools that penetrate into soil for aerating the soil before planting or uprooting weeds after planting. The implement 100 may be attached to the work machine or tractor (not shown) by a hitch assembly 112 such as a three-point hitch or a drawbar attachment. The hitch assembly 112 includes a hitch frame member 114 that extends longitudinally in a direction of travel for coupling to the work machine or tractor.

The agricultural implement 100 may include a transversely-extending frame that forms multiple frame sections. In FIG. 1, for example, the implement 100 includes a main or center frame 102. The main frame 102 is coupled to the hitch assembly 112 as shown. A first frame section or first inner frame 104 is positioned on one side of the main frame 102, and a second frame section or second inner frame 106 is positioned on an opposite side thereof.

While only a first and second frame section are shown coupled to the main frame, this disclosure also considers a third frame section coupled to an outside portion of the first frame section 104 and a fourth frame section coupled to an outside portion of the second frame section 106. Each frame section may be pivotably coupled to the frame section adjacent thereto. The first frame section 104, for example, may be pivotably coupled to the main frame 102. Similarly, the second frame section 106 may also be pivotably coupled to the main frame 102.

The implement 100 may be supported by a plurality of wheels. For example, the main frame 102 may be supported by a first pair of wheels 118 and a second pair of wheels 120. The first frame section 104 may be supported by a third pair of wheels 130 and the second frame section 106 may be supported by a fourth pair of wheels 136. While each section is shown being supported by a different pair of wheels, this is only shown in the illustrated embodiment. In other embodiments, there may be only a single wheel supporting each frame section. In a different embodiment, there may be more than a pair of wheels supporting each frame section. Moreover, the implement 100 may include one or more front wheels in addition to those described above. Further still, there may be back wheels disposed near the rear of the implement for additional support.

In the illustrated embodiment of FIG. 1, the agricultural implement 100 may include a plurality of actuators for controlling movement of the frame. Each actuator may be a hydraulic actuator, an electric actuator, a pneumatic actuator, an electric motor, or any other known actuator or motor capable of linear displacement. Moreover, each actuator may include an outer body or cylinder in which a rod or piston moves between an extended position and a retracted position. Further, one or more sensors may be positioned throughout the implement to identify the position of one or more of the actuators.

In FIG. 1, the main frame 102 includes a first actuator 122 and a second actuator 124. The first pair of wheels 118 may be coupled to the main frame 102 via a rock shaft (not shown) that may be hydraulically actuated by the first actuator 122. The second pair of wheels 120 may be coupled to the main frame 102 via another rock shaft (not shown) that may be hydraulically actuated by the second actuator 124. The actuators can raise or lower the main frame 102 relative to the wheels 118, 120. Further, one or more sensors (not particularly shown) may be coupled to the actuators, frame, or wheels to determine the height of the main frame 102 relative to the wheels 118, 120.

In FIG. 1, the main frame 102 includes a plurality of main frame members 126. A plurality of tools 152, 154, 156, 158 may be at least partially coupled to the main frame members 126 for engaging a ground surface or soil upon which the implement travels. Similarly, the first frame section 104 includes a plurality of first frame members 128 and the second frame section 106 includes a plurality of second frame members 134. Each of these frame members may be at least partially coupled to one or more of the plurality of work tools 152, 154, 156, 158.

Also shown in FIG. 1 is a first side actuator 160 and a second side actuator 162. The first side actuator 160 may be pivotally coupled between the main frame section 102 and the first frame section 104. Similarly, the second side actuator 162 may be pivotally coupled between the main frame section 102 and the second frame section 106. More specifically, the main frame section 102 may have a support tower 164 providing an elevated coupling location for the first and second actuators 160, 162 relative to the coupling location on the corresponding first and second frame sections 104, 106.

In the above-described configuration, the first side actuator 160 may be selectively repositioned to provide varying levels of force on the corresponding first frame section 104 relative to the main frame section 102. More specifically, the first frame section 104 may be pivotable relative to the main frame section 102 about a first frame axis 192. Accordingly, repositioning or varying the linear displacement of the first side actuator 160 provides a torsional force on the first frame section 104 about the first frame axis 192.

Similarly, the second side actuator 162 may be selectively resized to provide varying levels of force on the corresponding second frame section 106. More specifically, the second frame section 106 may pivot relative to the main frame section 102 about a second frame axis 166. Accordingly, repositioning or varying the linear displacement of the second side actuator 162 provides a torsional force on the second frame section 106 about the second frame axis 166. In one embodiment, each actuator 160, 162 may also have a corresponding sensor identifying the linear displacement of each actuator 160, 162.

While the first and second side actuators 160, 162 are shown and described towards the front direction 168 of the implement 100, this disclosure contemplates other locations for the actuators 160, 162. Further still, other embodiments may utilize more actuators than just the first and second side actuators 160, 162 to provide the torsional forces on the corresponding frame sections 104, 106. In one embodiment, additional actuators are located at a rear portion of the implement opposite the front direction 168. In this embodiment, two actuators may apply a torsional force to the corresponding frame sections 104, 106 instead of just one. Further still, any number of actuators can be used per side to meet the needs of the particular implement application. Accordingly, this disclosure is not limited to any particular number of side actuators.

In yet another embodiment, additional frame sections may be pivotally coupled to the frame sections 104, 106 utilizing actuators similar to the first and second side actuators 160, 162 to adjust the corresponding relationship of the frame members. More specifically at least one side actuator may be positioned between each additional frame section similarly as described above for the first and second frame sections 104, 106.

In the embodiment shown in FIG. 1, rear attachments 170, 172, 174 are shown coupled to the corresponding frame sections 102, 104, 106. More specifically, a main rear attachment 170 is coupled to a rear portion of the main frame section 102, a first section rear attachment 172 is coupled to a rear portion of the first frame section 104, and a second section rear attachment 174 is coupled to a rear portion of the second frame section 106. The rear attachments 170, 172, 174 may be selectively coupled to the corresponding frame sections 102, 104, 106 or be configured to selectively engage the underlying ground. In one aspect of this embodiment, the rear attachments 170, 172, 174 may have an actuator and a position sensor or the like coupled thereto. In this configuration, the rear attachments 170, 172, 174 may be selectively raised off of the underlying surface or pressed into the underlying surface. Further, the orientation and existence of the rear attachments 170, 172, 174, may alter the forces experienced by the corresponding frame section 102, 104, 106.

While the rear attachments 170, 172, 174 shown in FIG. 1 are flat-bar roller type rear attachments, this disclosure is not limited to such a configuration. Any rear attachment is considered herein, including, but not limited to harrow-type rear attachments as well.

In yet another aspect of the embodiment illustrated in FIG. 1, a fore-aft actuator 176 may be coupled to the main frame section 102. More specifically, the fore-aft actuator 176 may be coupled to a portion of the support tower 164 on a first end and to the main frame section 102 at a second end. The main frame section 102 and the corresponding first and second frame sections 104, 106 may be pivotally coupled to the hitch assembly 112 or other portion of the implement 100. The frame sections 102, 104, 106 may pivot about a transverse axis 178 in a fore direction 180 or an aft direction 182. In this non-limiting example, the fore-aft actuator 176 may be selectively repositionable to alter the orientation of the frame sections 102, 104, 106 in the fore direction 180 or the aft direction 182 about the transverse axis 178. Further, the fore-aft actuator 176 may have a position sensor or the like (not particularly shown) that indicates the fore-aft position of the frame sections 102, 104, 106.

In yet another aspect of the embodiment shown in FIG. 1, a tool axis 184, 186, 188, 190 may be defined through each of the respective work tools 152, 154, 156, 158. Each tool axis 184, 186, 188, 190 may be adjustable relative to the transverse axis 178 to provide a different tool angle. By varying the tool angle of the work tools 152, 154, 156, 158, the implement can better accommodate different ground conditions. Accordingly, actuators and sensors or the like may also be coupled to the work tools 152, 154, 156, 158 to provide varying work tool angles.

While FIG. 1 represents an illustrated embodiment of an agricultural implement with three frame sections, this disclosure is not limited to this embodiment. Other embodiments may include only one section. Alternatively, there may be more than three frame sections in further embodiments. Thus, this disclosure is not limited to any number of frame sections, and the teachings herein may be applicable to any implement regardless of the number of frame sections it contains.

Figure 2:
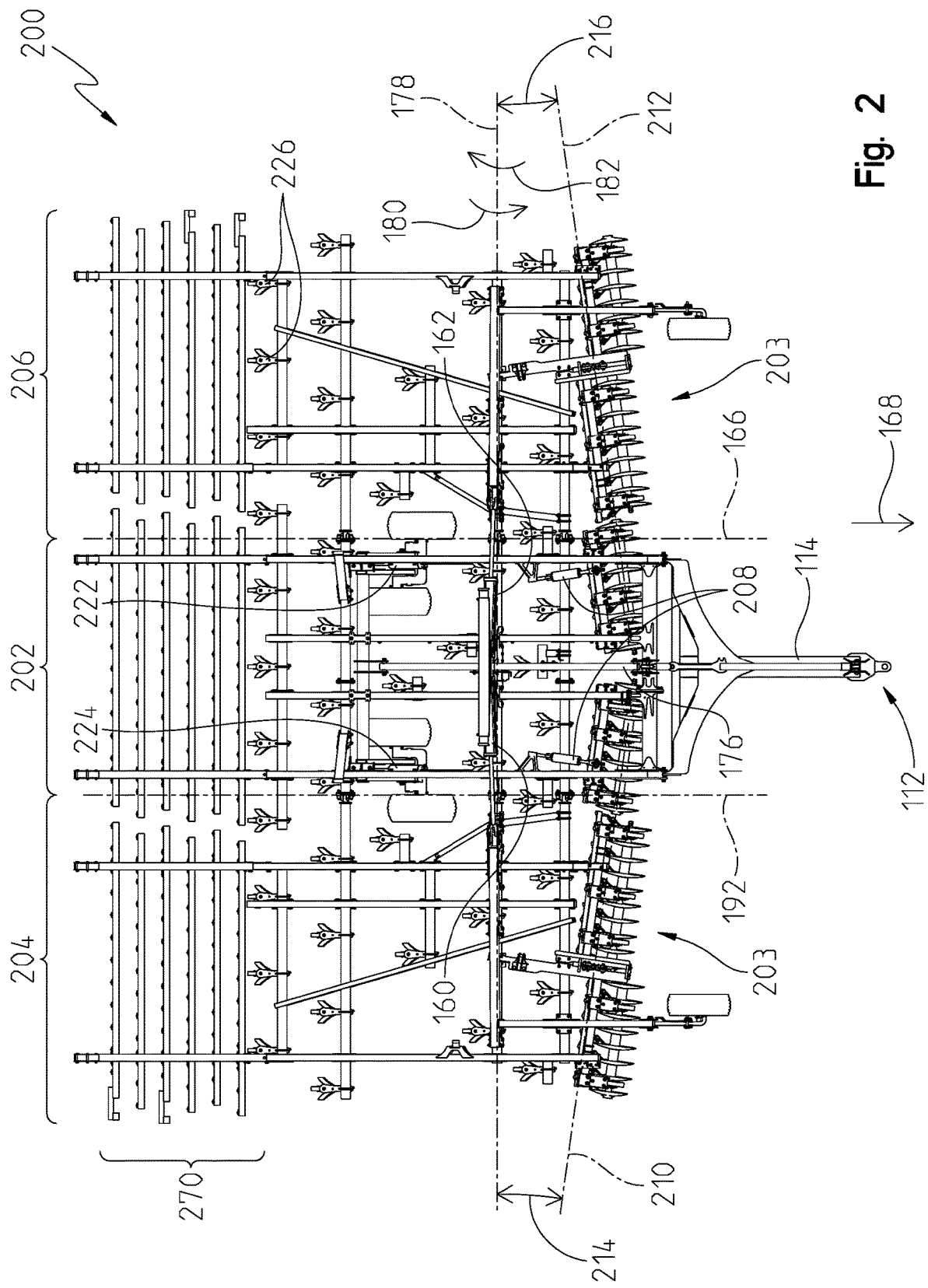
FIG. 2 is a top view of another embodiment of an agricultural implement.

Referring now to FIG. 2, another embodiment of an implement 200 is shown. The implement 200 may have many similar features of the implement 100 described above for FIG. 1. More specifically, the implement 200 may have a hitch assembly 112 and a hitch frame 114. The implement may have at least a main frame section 202 and a first and second frame section 204, 206 coupled thereto on either side. Further, a first and second pair of wheels 218, 220 may be pivotally coupled to the implement 200 via a first and second actuator 222, 224. Further, the implement 200 may also have a first and second side actuator 160, 162 configured to pivot the respective frame section 204, 206 about the corresponding frame axis 192, 166 as described above for FIG. 1. Further still, the implement 200 may also have a fore-aft actuator 176 configured to rotate the main frame about the transverse axis 178 as described above.

FIG. 2 also shows a plurality of front work tools 203 pivotally coupled to the corresponding frame sections 202, 204, 206. In the embodiment shown in FIG. 2, the plurality of front work tools 203 may be pivotally coupled to the corresponding frame sections 202, 204, 206 through one or more front work tool actuators 208. Similar to FIG. 1, the implement 200 of FIG. 2 may also define tool axis 210, 212 that may be selectively offset from the transverse axis 178 at a tool angle 214, 216. In one embodiment, the front tool actuator 208 may be repositionable to alter the tool angle 214, 216 of the plurality of front work tools 203. In yet another aspect of this example, one or more sensors may be coupled to the implement to determine the orientation of the plurality of front work tools 203.

The implement 200 may also have a plurality of rear work tools 226 that are different from the plurality of front work tools 203. In this embodiment, the fore-aft actuator 176 may control the tool depth of the plurality of front work tools 203 relative to the plurality of rear work tools 226. More specifically, while the first and second actuators 222, 224 may selectively reposition the corresponding first and second pairs of wheels 218, 220 relative to the frame, the fore-aft actuator 176 may control the fore-aft rotation 180, 182 of the implement 200 relative to the transverse axis 178. In other words, the first and second actuators 222, 224 may be repositionable along with the fore-aft actuator 176 to establish a desired tool depth for both the plurality of front work tools 203 and the plurality of rear work tools 226.

In one non-exclusive example, if the tool depth of the plurality of front work tools 203 is desired to be lower than the tool depth of the plurality of rear work tools 226, then the fore-aft actuator 176 may reposition to rotate the implement in the fore direction 180, thereby increasing the tool depth of the plurality of front work tools 203 relative to the plurality of rear work tools 226. Alternatively, if the tool depth of the plurality of front work tools 203 is desired to be higher than the tool depth of the plurality of rear work tools 226, then the fore-aft actuator 176 may reposition to rotate the implement in the aft direction 182, thereby decreasing the tool depth of the plurality of front work tools 203 relative to the plurality of rear work tools 226.

The implement 200 may also have a rear attachment 270 removably coupled to each of the frame sections 202, 204, 206. The rear attachment 270 may be a harrow-type attachment that is removably coupled to the rear end of the corresponding frame sections 202, 204, 206. In one embodiment, the rear attachment 270 may also have an actuator and a position sensor (not particularly shown) that alters the amount of down pressure exerted by the rear attachment 270 on the underlying surface. Further still, the actuator of the rear attachments 270 may raise the attachment off the underlying surface as well.

Altering the position of any one of the components described above may also affect the positioning of the other components of the implement 100 or 200. More specifically, as described above for the implement 200 of FIG. 2, repositioning the fore-aft actuator 176 rotates the implement 200 in the fore or aft direction 180, 182, thereby changing the tool depth of the various tools coupled thereto. In yet another example, the existence and orientation of a rear attachment 170, 172, 174, 270 also affects the down force experienced by the rear portion of the implement, thereby affecting tool depth among other things. Further still, the depth and angular orientation of the work tools 152, 154, 156, 158, 203 can also affect the remaining components of the implement 100, 200 requiring the first and second side actuators 160, 162 to reposition the corresponding frame sections to ensure even distribution of force throughout the implement 100, 200 as it travels along the underlying surface.

In one aspect of the present disclosure, displacement sensors or the like may be positioned on any one of the work tools 152, 154, 156, 158 and the rear attachments 170, 172, 174 of the implement 100 from FIG. 1, or the plurality of front work tools 203, the plurality of rear work tools 226, and the rear attachment 270 of the implement 200 from FIG. 2. The displacement sensors may be any type of sensor known in the art capable of identifying movement of the corresponding work tool relative to the frame portion it is coupled to. In other words, the displacement sensor may be positioned at a location that identifies movement of that portion of the work tool relative to the frame.

In one non-limiting example illustrated in FIG. 1, the work tools 152, 154, 156, 158 are coupled to the corresponding frame section via cushion springs 194. Multiple cushion springs 194 may be positioned along each of the work tools 152, 154, 156, 158 to springedly couple the work tools 152, 154, 156, 158 to the corresponding frame. In one aspect of this example, a strain gauge or the like may be coupled to the cushion springs 194 to identify the displacement of the cushion spring 194 under a load. In this example, when the work tools 152, 154, 156, 158 of the implement contact debris on the underlying surface, the corresponding cushion spring 194 will deflect to allow the work tool to bypass the debris. The corresponding strain gauge will identify the deflection and send a signal to a controller indicating contact with the debris.

Similarly, in the non-limiting example illustrated in FIG. 1, the rear attachments 170, 172, 174 are coupled to the corresponding frame section via attachment arms 196. Multiple attachment arms 196 may be positioned along each of the rear attachments 170, 172, 174 to pivotally couple the rear attachments 170, 172, 174 to the corresponding frame. In one non-limiting example, a position sensor or the like may be coupled to the attachment arms 196 to identify the displacement of the rear attachments 170, 172, 174 as they pass over debris. In this example, when the rear attachments 170, 172, 174 of the implement contact debris on the underlying surface, the corresponding attachment arms 196 will deflect to allow the rear attachment to bypass the debris. The corresponding position sensor will identify the deflection and send a signal to the controller indicating contact with the debris.

The implement 200 of FIG. 2 may similarly have sensors or the like positioned along the front work tools 203, rear work tools 226, and the rear attachment 270. More specifically, the front work tools 203 may have cushion springs with strain gauges coupled thereto similar to the implement 100 described above for FIG. 1. Further, the rear work tools 226 may each have a position sensor coupled thereto. The position sensor may measure the deflection of a tillage tool point of the respective rear work tool 226. Further still, the rear attachment 270 may also have a position sensor that identifies displacement of the rear attachment 270.

Figure 3:
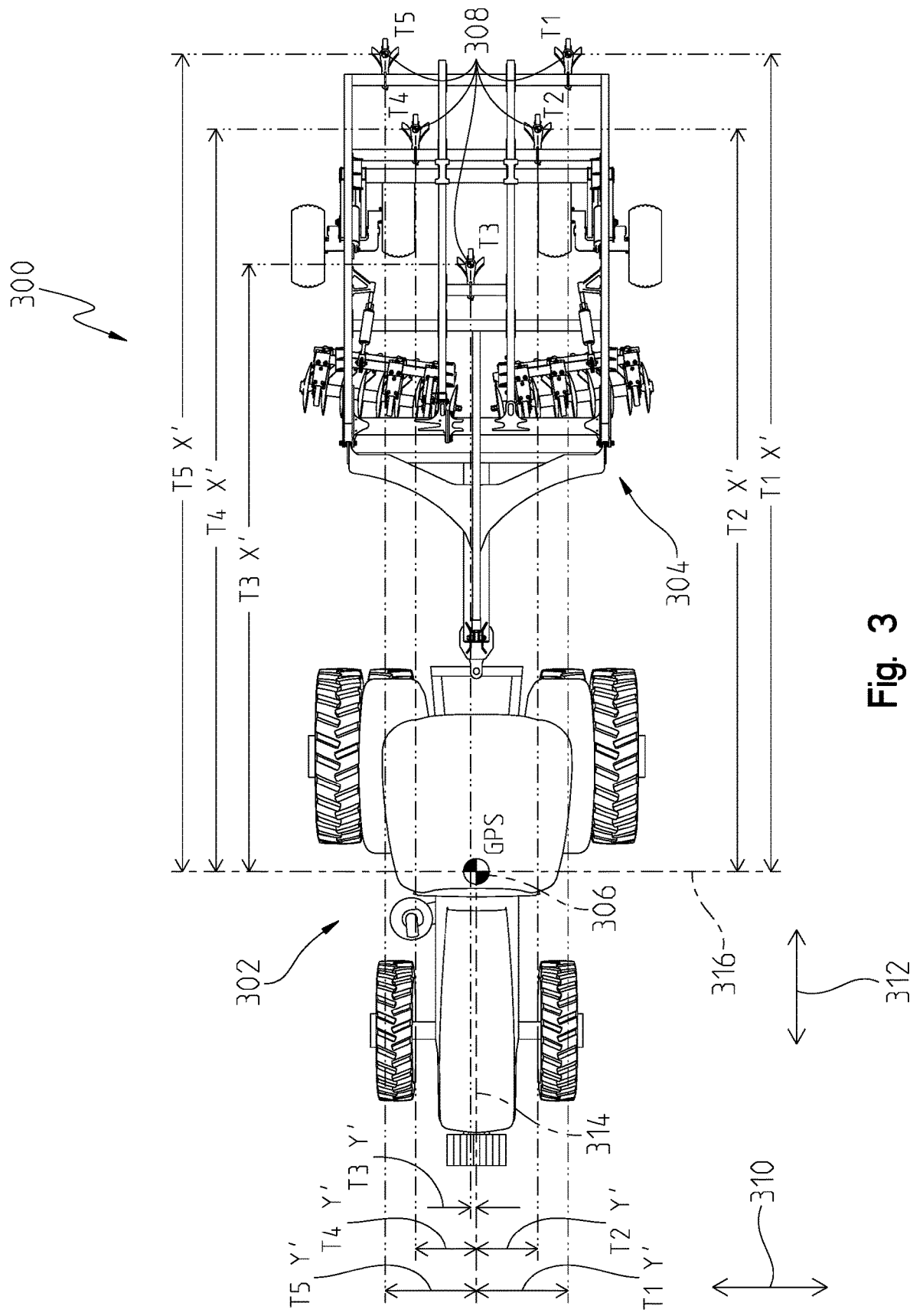
FIG. 3 is a top view of another embodiment of an agricultural implement coupled to a tractor.

Referring now to FIG. 3, one non-exclusive example of a mapping system 300 is illustrated. The mapping system 300 may be integrated into a tractor 302 coupled to an implement 304. The implement 304 may be any implement that engages the underlying surface. Further, embodiments considered herein may have the implement 100 of FIG. 1 or the implement 200 of FIG. 2. In the embodiment of FIG. 3, the tractor 302 may have a Global Positioning System (hereinafter "GPS") 306 coupled thereto. The GPS 306 may be integrated into the electrical components of the tractor 302 or alternatively may be added on to the tractor 302 as an accessory. Further, while the GPS 306 is described herein as being coupled to the tractor 302, this disclosure is not limited to such a configuration. Rather, the GPS 306 may be located anywhere on the tractor 302, or the implement 304, while remaining within the teachings of this disclosure.

In addition to having a GPS 306, the implement 304 may have a plurality of sensors 308 coupled thereto. The plurality of sensors 308 may each be coupled a ground engaging mechanism such as the work tools and attachments described above. In one non-exclusive example, the ground engaging mechanism may be any one of a ripper, a blade, a roller, a sweep, a tine or the like. Further, each ground engaging mechanism may be coupled to a sensor T1-T5 of the plurality of sensors 308 that identifies when the work tool or attachment moves relative to the frame of the implement 304. Both the GPS 306 and the plurality of sensors 308 may communicate with a controller 406 (see FIG. 4). More specifically, the GPS 306 may communicate the location of the GPS 306 to the controller 406 and the plurality of sensors 308 may communicate when the corresponding ground engaging mechanism moves. As will be explained in more detail below, the controller 406 may identify the specific location of debris in the underlying surface based on the plurality of sensors 308 and the GPS 306.

The GPS 306 may have an antenna coupled thereto. The antenna of the GPS 306 may receive signals from satellites or the like to determine the location of the antenna with the GPS 306. In other words, the physical location of the antenna may be the basis for the location identified by the GPS 306. In the non-limiting example of FIG. 3, the antenna may be located at a substantially central portion of the tractor 302. However, the antenna may be located other places as well. In a different example, the antenna may be located towards a front, rear, or side portion of the tractor 302. In yet another embodiment, the antenna may be located on the implement 304 rather than the tractor 302. Accordingly, the particular location of the antenna for the GPS 306 is not limiting, and this disclosure considers many different antenna locations.

While this disclosure considers locating the antenna of the GPS 306 in several different locations along the tractor 302 or implement 304, the particular orientation of the plurality of sensors 308 may be stored in the controller relative to the antenna of the GPS 306. As described above, the plurality of sensors 308 may communicate to the controller when the corresponding ground engaging mechanism contacts debris. To properly determine the location of the debris, the controller may determine the location of the particular sensor T1-T5 relative to the location identified by the antenna of the GPS 306. In other words, the controller 406 may determine the location of the antenna for the GPS 306 when one of the plurality of sensors 308 identifies debris. Then, the controller 406 may determine the location of the debris by applying pre-loaded position offsets of the corresponding sensor T1-T5 relative to the antenna.

In the non-limiting example of FIG. 3, the antenna may be located at the GPS 306. Further, sensor T1 may be located a T1 Y' distance from the antenna along a Y direction 310, and a T1 X' distance from the antenna along an X direction 312. The T1 Y' distance may be the distance the T1 sensor is offset along the Y direction 310 from a Y antenna axis 314 defined through the antenna of the GPS 306. Similarly, the T1 X' distance may be the distance the T1 sensor is offset along the X direction 312 from an X antenna axis 316 defined through the antenna of the GPS 306.

Similarly, sensor T2 may be located a T2 Y' distance from the antenna along the Y direction 310, and a T2 X' distance from the antenna along the X direction 312. The T2 Y' distance may be the distance the T2 sensor is offset along the Y direction 310 from the Y antenna axis 314. Similarly, the T2 X' distance may be the distance the T2 sensor is offset along the X direction 312 from the X antenna axis 316.

Sensor T3 may be located a T3 Y' distance from the antenna along the Y direction 310, and a T3 X' distance from the antenna along the X direction 312. The T3 Y' distance may be the distance the T3 sensor is offset along the Y direction 310 from the Y antenna axis 314. Similarly, the T3 X' distance may be the distance the T3 sensor is offset along the X direction 312 from the X antenna axis 316.

Similarly, sensor T4 may be located a T4 Y' distance from the antenna along the Y direction 310, and a T4 X' distance from the antenna along the X direction 312. The T4 Y' distance may be the distance the T4 sensor is offset along the Y direction 310 from the Y antenna axis 314. Similarly, the T4 X' distance may be the distance the T4 sensor is offset along the X direction 312 from the X antenna axis 316.

Sensor T5 may similarly be located a T5 Y' distance from the antenna along the Y direction 310, and a T5 X' distance from the antenna along the X direction 312. The T5 Y' distance may be the distance the T5 sensor is offset along the Y direction 310 from the Y antenna axis 314. Similarly, the T5 X' distance may be the distance the T5 sensor is offset along the X direction 312 from the X antenna axis 316.

The T1-T5 X' distance and the T1-T5 Y' distance may be measured in any known distance unit. For example, feet, inches, meters, centimeters, and the like are all forms of measurement considered herein and this disclosure is not limited to any particular unit for measuring these values. Further still, the X' and Y' values may not be distance units at all. Rather, the X' and Y' distances may be formulas or coordinate offsets that allow the controller to determine the proper GPS coordinates of the corresponding sensor T1-T5. In one non-limiting example, a polar coordinate system may be utilized for each of the sensors T1-T5 instead of the above-described coordinate system.

Figure 4:
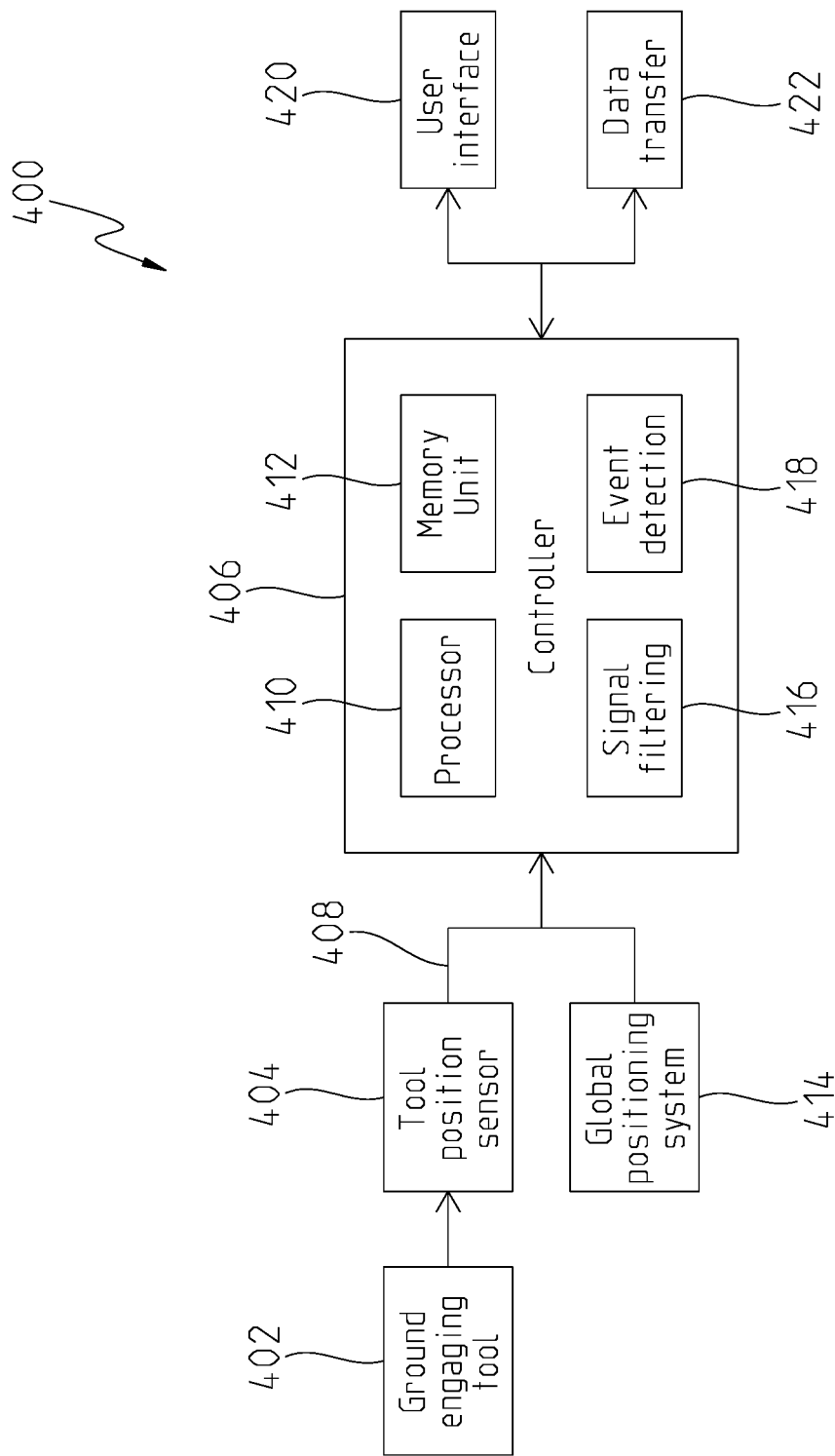
FIG. 4 is a schematic diagram of some of the systems of FIG. 3.

Referring now to FIG. 4, a schematic diagram 400 of some of the systems described herein is illustrated. In the schematic diagram 400, a ground engaging tool 402 is illustrated as coupled to or otherwise monitored by a tool position sensor 404. The ground engaging tool 402 can be any of the work tools 152, 154, 156, 158, 203, 226 or rear attachments 170, 172, 174, 270 described herein. However, this disclosure also considers ground engaging tools such as planters and the like. Accordingly, any type of ground engaging tool that may contact debris on or in the underlying surface is considered herein, and this disclosure is not limited to the particular examples provided.

Further, the tool position sensor 404 may be any of the sensors T1-T5 previously described. In a couple non-limiting examples, the tool position sensor 404 may be a strain gauge or a position sensor. However, this disclosure is not limited to any particular type of sensor. In a different example, the tool position sensors 404 may be a camera or other optical sensor. The camera may identify debris by scanning the underlying surface or by identifying substantial movement of the ground engaging tool 402. Accordingly, any sensor capable of determining movement of the ground engaging tool 402 or debris on the underlying surface is considered herein, and this disclosure is not limited to the precise sensors discussed.

The tool position sensor 404 may communicate with the controller 406 via communication lines 408. The controller 406 may have, or otherwise be in communication with, a processor 410 and a memory unit 412. The communication lines 408 may be a wire harness or the like that electrically couples the tool position sensor 404 to the controller 406. In this configuration, electric signals may be sent to the controller 406 from the tool position sensor 404 through the communication lines 408. The electric signals may be processed by the controller 406 to determine a tool position.

While the communication lines 408 are described herein as being a wire harness, in other embodiments the communication lines 408 may be wireless. More specifically, the tool position sensor 404 may wirelessly transmit the electric signals to the controller 406 instead of through the wire harness described above.

Also in communication with the controller 406 via communication lines 408 is a GPS 414. The GPS 414 may be the GPS 306 from the tractor 302 or it may be an entirely independent GPS unit. Alternatively, the GPS 414 may be a GPS unit of the implement 304. At any rate, the GPS 414 may communicate to the controller 406 a geographic location of an antenna of the GPS 414. More specifically, the GPS 414 may send to the controller 406 the coordinates of the GPS 414 at any given time. In one non-exclusive example, the GPS 414 sends data identifying the longitude and the latitude of the GPS 414.

The GPS 414 and tool position sensor 404 may refresh the coordinates and signals sent to the controller 406 at any appropriate speed. In one non-exclusive example, the coordinates of the GPS 414 and signals from the tool position sensor 404 may be sent to the controller 406 at 5 hertz. The coordinates and signals may be temporarily stored in the memory unit 412 or immediately deleted if no event has been triggered. More specifically, the controller 406 may also apply a signal filtering 416 algorithm to the electric signals received from the tool position sensor 404. The signal filtering 416 algorithm may filter out unwanted noise from the electric signals such as electrical interference or the like. The signal filtering may average the electric signal value over a preset time to determine an average signal value. Many different types of signal filtering algorithms are considered herein, and this disclosure is not limited to any particular type of signal filtering algorithm.

The controller 406 may then execute an event detection 418 based on the average signal value at a given time. The event detection 418 may include comparing the average signal value to an event threshold value stored in the memory unit. The event threshold value may be a value predetermined to identify when the ground engaging tool 402 contacts unexpected debris. In other words, the event detection 418 identifies when the tool position sensor 404 indicates that the ground engaging tool 402 has contacted an object in the underlying surface.

The controller 406 may also send and receive signals from a user interface 420 and a data transfer assembly 422. The user interface 420 may display the active location of the GPS 414 along with the corresponding ground engaging tools 402. Further, the user interface 420 may provide at least one user input that allows the user to indicate a preference to the controller 406. For example, when the controller 406 identifies an event 418, the user interface 420 may provide the user input to store event location data in the memory unit 412 if selected. If the user input is not selected, or a user input is selected showing the user did not want to store the event location data, the event location data will be removed from the memory unit.

The data transfer assembly 422 may provide a communication outlet for the controller 406 to send information stored in the memory unit 412 or live data values to a remote device such as a computer, tablet, or smart phone. The data transfer assembly 422 may be a wired connection interface such as Ethernet or the like or the data transfer assembly 422 may be a wireless protocol that allows the controller 406 to wirelessly send data to the remote device. In one non-limiting example, the user interface 420 may be a remote device that utilizes the data transfer assembly 422.

While the example of FIG. 4 shows only one ground engaging tool 402 and tool position sensor 404, any number of ground engaging tools and tool position sensors is considered herein. More specifically, the example illustrated in FIG. 3 may have five ground engaging tools that correspond with the five tool position sensors (plurality of sensor 308) that communicate with the controller 406. Each of the tool position sensors may communicate with the controller 406 as described above. Accordingly, this disclosure is not limited to any particular number of tool position sensors or ground engaging tools.

Figure 5:
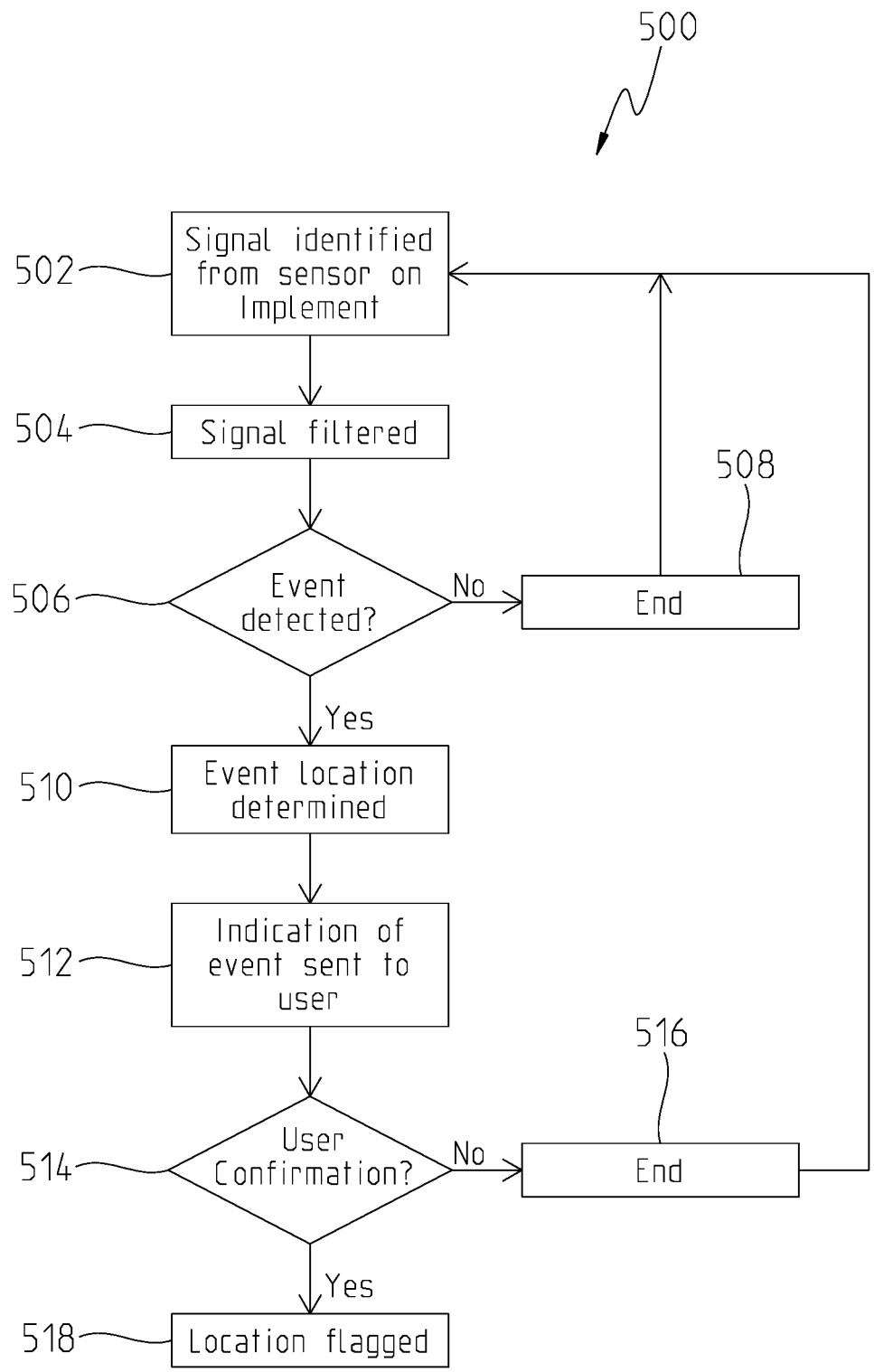
FIG. 5 is a diagram of a control system logic for the systems of FIG. 3.

Referring now to FIG. 5, one embodiment of a control system logic 500 is illustrated. The control system logic 500 may be implemented with the systems shown and described for FIG. 4 above, however, this control system logic 500 is not limited to such a configuration. In box 502, the controller 406 may first identify the electric signal sent to the controller 406 from the tool position sensor 404. Next, in box 504 the controller 406 may implement the signal filtering 416 with the controller 406 to identify an average electric signal over a set time. While the signal filtering of box 504 is described as averaging an electric signal over time, other filters are considered as well and this disclosure is not limited to any particular type of signal filter.

In box 506 the controller 406 determines whether the filtered signal passes an event threshold stored in the memory unit 412 of the controller 406. The event threshold may be any signal value that is above expected signal values. For example, if the ground engaging tool 402 is contacting a loose soil, slight variances in displacement of the ground engaging tool 402 may be expected, and the event threshold may be set so the controller 406 does not identify an event during slight variance in displacement. However, when the ground engaging tool 402 contacts a rock or the like, the ground engaging tool 402 may transition to a contact position where a substantial variance in the position of the ground engaging tool 402 may be identified by the tool position sensor 404. The substantial variance may be above the event threshold and the controller 406 may identify the substantial variance as an event in box 506. That is to say, in box 506 the controller 406 determines whether any tool position sensor 404 is indicating that the corresponding ground engaging tool 402 has contacted large enough debris to surpass the stored event threshold.

If no event is detected in box 506, the control system logic 500 will end in box 508. After the control system 500 ends in box 508, it will continue to monitor the signals received from the tool position sensor 404. Further, if a new signal is identified in box 502, the control system 500 will continue through the remaining boxes as described herein. In other words, in box 508 the control logic system ends only with regards to that particular signal analysis but continues to monitor other signals.

If an event is identified in box 506, the controller utilizes the GPS 414 and data stored in the memory unit of the controller to determine the location of the event in box 510. More specifically, the controller 406 may have the X' and Y' offset values of FIG. 3 stored in the memory unit 412 for each tool position sensor 404. When the event is detected in box 506, the controller 406 identifies the GPS coordinates at the time of the event using the GPS 414 and the specific sensor that identified the event (sensors T1-T5 of FIG. 3 for example). The controller 406 then determines the precise location of the event by offsetting the GPS coordinates by the X' and Y' values that correspond with the sensor T1-T5 that detected the event. For example, if sensor T4 detected the event, the GPS coordinate would be offset T4 X' in the X direction 312 and T4 Y' in the Y direction 310 to determine the precise event location.

Once the event location is determined in box 510, a warning or other indication of the event may be sent to the user interface 420 in box 512. The indication of the event may be a light, sound, or other indication sent to the user to indicate that an event has been detected by the controller 406. In one non-exclusive example, the indication of event may include a map showing the location of the event. In other embodiments, the indication of the event may be a visual message on the user interface 420 explaining that an event was detected. Further still, in another embodiment an audio alarm may sound when the controller 406 identifies an event.

In one embodiment of the present disclosure, the controller 406 may require a user confirmation prior to flagging the location in box 514. More specifically, after the indication of the event is sent to the user in box 512, the controller 406 may seek a user confirmation via a user input. The user input may be a selection option on the user interface 420 or a separate user input such as a push button or the like positioned in the tractor 302. Whatever the form of the user input, it may indicate to the controller whether the user wants to flag the location of the identified event. More specifically, if the user does not select the user input after a preset time, or if the user selects to ignore the event, the controller 406 may end the control system logic 500 with regards to this particular signal in box 516. In box 516, the controller 406 may delete the previously determined event location and return to box 502.

If the user input is selected, however, the controller 406 may then proceed to flag the event location in box 518. By flagging the event location, the controller 406 may store the GPS coordinates of the event as determined in box 510 in the memory unit 412 of the controller 406 or other storage location. Further, the controller 406 may utilize the data transfer 422 to transfer the GPS coordinates of the event location to a remote device. The location 518 may remain flagged in the memory unit 412 until the user downloads the data via the data transfer 422 or it may remain on the memory unit until the user deletes the event location with the user interface 420. In other words, the GPS coordinates of the event identified by the controller 406 may be preserved for later review.

In one embodiment considered herein, there may be no boxes 512, 514, and 516. In this embodiment when an event location is determined in box 510, the controller 406 may flag the event in box 518 as described above. In this embodiment, all event locations may automatically be flagged without any user interaction. In use, when the user has completed a work routine with the tractor 302 and the implement 300, the user may download any identified event locations from the memory unit 412 via the data transfer 422. Alternatively, each time an event location is determined in box 510, the controller 406 may automatically utilize the data transfer 422 to flag the event location on a remote device.

In one non-exclusive example referring to FIGS. 3-5, a user may intend to execute work process on an underlying surface or otherwise work a field. The user may be in the tractor 302 coupled to the implement 304 and have the user interface 420 positioned proximate to the user. The user interface may be a touch screen display or the like that allows the user to control the components of the tractor 302 and implement 304 among other things. Further, each of the sensors T1-T5 may be positioned to identify when the corresponding ground engaging mechanisms contact debris. In this example, each of the sensors T1-T5 may be tool position sensors 404 and send electric signals to the controller 406 indicating the position of the corresponding ground engaging tools 402 as the user continues to work the field. The controller 406 may substantially simultaneously execute the signal identification, filtering, and event detection boxes 502, 504, 506 for each of the sensors T1-T5 throughout the work process. If any one of the sensors T1-T5 identifies an event, the controller 406 will determine the event location as it corresponds with that particular sensor T1-T5 and continue through the control system logic 500 as described above.

In this example, once the user is finished working the field, the user may review all of the locations flagged during the process. More specifically, the user may utilize the user interface 420 to see the geographic location identified for each event. Further, the user may download a map or other data indicating each location identified for each event via the data transfer 422. The user may then return to the field and inspect each location where debris was identified via the sensors T1-T5. The user may then have the opportunity to remove the debris to prevent future machine damage.

In a different embodiment of the present disclosure, the tool position sensors 404 may be a camera or other optical sensor. The camera may identify debris by scanning the underlying surface or by identifying substantial movement of the ground engaging tool. This embodiment may utilize the control system logic 500 as described above for the sensors T1-T5 but implements cameras instead of the position sensors described herein.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A work machine, comprising:
   a frame member;
   a ground engaging mechanism coupled to the frame member and configured to at least partially contact an underlying surface;
   a sensor coupled to the ground engaging mechanism, the sensor positioned to identify a displacement of the ground engaging mechanism relative to the frame;
   a controller in communication with the sensor; and
   a location system in communication with the controller;
   a user interface that includes a user input;
   wherein, the controller is configured to send a confirmation to the user interface when the sensor identifies the displacement of the ground engaging mechanism, and the user input must be engaged during the confirmation for the controller to mark a location of the ground engaging mechanism, the location being identified by the location system when the sensor identifies the displacement of the ground engaging mechanism.

2. The work machine of claim 1, further wherein the ground engaging mechanism is any one of a ripper, a blade, a roller, a sweep, or a tine.

3. The work machine of claim 1, further wherein the controller receives data from the sensor and the controller applies a filter to the data before identifying the displacement.

4. The work machine of claim 1, further wherein the frame member and ground engaging mechanism are part of a tillage implement coupled to a tractor.

5. The work machine of claim 4, further wherein the location system is positioned on the tractor.

6. The work machine of claim 5, further wherein the controller is configured to determine the location of the ground engaging mechanism relative to the location system before the controller marks the location.

7. A method for identifying an obstruction in a field, comprising:
providing a ground engaging mechanism, a location system, a controller, and a sensor;
communicating, to the controller, a primary position of the location system;
storing, in the controller, a ground engaging offset determined relative to the primary position;
identifying, with the controller communicating with the sensor, when the ground engaging mechanism transitions to a contact position; and
determining, with the controller, a ground engaging location based on the primary position and the ground engaging offset when the ground engaging mechanism is in the contact position;
providing a user interface including a user input having an engaged position;
sending an indication to the user interface when the ground engaging mechanism transitions to the contact position;
storing the ground engaging location in a memory unit when the user input is transitioned to the engaged position; and
removing the ground engaging location stored in the memory unit during the storing the ground engaging location step when the user input is not transitioned to the engaged position within a preset time.

8. The method of claim 7, further wherein the location system is global positioning system and the primary position is a geographic coordinate.

9. The method of claim 7, further wherein the user input has a disengaged position, the method further comprising:
when the user input is transitioned to the disengaged position, removing the ground engaging location stored in the memory unit during the storing the ground engaging location step.

10. The method of claim 7, further wherein the ground engaging location is determined based on a length value and a width value relative to the location system stored in the controller.

11. The method of claim 10, further wherein the determining the ground engaging location step is executed by determining the ground engaging location based on the length value, the width value, and the primary position.

12. A system for identifying an obstruction in an underlying surface, the system comprising:
a work machine having a location system;
a controller in communication with the location system to actively determine a first geographic location of the work machine;
an implement coupled to the work machine and having a first ground engaging mechanism; and
a first sensor coupled to the first ground engaging mechanism and in communication with the controller, the first sensor configured to identify a contact movement of the first ground engaging mechanism;
a user interface that includes a user input
wherein, the controller determines a second geographic location for the first ground engaging mechanism based on a distance of the first ground engaging mechanism from the location system when the first sensor identifies the contact movement;
wherein, the controller sends an indication to the user interface when the first sensor identifies the contact movement, and the user input must be engaged during the indication for the controller to store the second geographic location in a memory unit.

13. The system of claim 12, further wherein the user input must be engaged during a preset time for the controller to store the second geographic location in the memory unit.

14. The system of claim 12, further wherein the user interface sends an audio or visual signal each time the contact movement is identified by the controller.

15. The system of claim 12, further comprising a second ground engaging mechanism and a second sensor, wherein the second ground engaging mechanism is located at a different location relative to the location system than the first ground engaging mechanism.

* * * * *